United States Patent
Soerli et al.

(10) Patent No.: US 7,379,391 B2
(45) Date of Patent: May 27, 2008

(54) MARINE SEISMIC AIR GUN TIMING

(75) Inventors: Jon Magnus Soerli, Svelvik (NO); Thomas William Marshall, Morpeth (GB)

(73) Assignee: WesternGeco L.L.C., Houston, TX (US)

( * ) Notice: Subject to any disclaimer, the term of this patent is extended or adjusted under 35 U.S.C. 154(b) by 424 days.

(21) Appl. No.: 11/282,986

(22) Filed: Nov. 18, 2005

(65) Prior Publication Data
US 2007/0115757 A1    May 24, 2007

(51) Int. Cl.
*G01V 1/38* (2006.01)
(52) U.S. Cl. ..................................... 367/144
(58) Field of Classification Search ............. 367/144
See application file for complete search history.

(56) References Cited

U.S. PATENT DOCUMENTS

| | | | |
|---|---|---|---|
| 4,300,653 A * | 11/1981 | Cao et al. ................. | 367/144 |
| 4,476,553 A | 10/1984 | Ziolkowski et al. | |
| 4,648,080 A | 3/1987 | Hargreaves | |
| 4,658,384 A | 4/1987 | Dragoset, Jr. et al. | |
| 4,757,482 A | 7/1988 | Fiske, Jr. | |
| 4,868,794 A | 9/1989 | Ziolkowski et al. | |
| 4,992,990 A | 2/1991 | Langeland et al. | |
| 5,184,329 A * | 2/1993 | Regnault et al. ............ | 367/23 |
| 5,357,892 A | 10/1994 | Vatne et al. | |
| 5,668,775 A | 9/1997 | Hatteland | |
| 6,477,111 B1 | 11/2002 | Lunde et al. | |
| 6,498,768 B1 | 12/2002 | Gjestrum et al. | |
| 6,671,223 B2 | 12/2003 | Bittleston | |
| 6,684,160 B1 | 1/2004 | Ozbek et al. | |
| 6,788,618 B2 | 9/2004 | Clayton et al. | |
| 2004/0032794 A1 | 2/2004 | Clayton | |
| 2007/0115757 A1* | 5/2007 | Soerli et al. ................ | 367/144 |

FOREIGN PATENT DOCUMENTS

| | | | |
|---|---|---|---|
| GB | 2148001 A | * | 5/1985 |
| GB | 2432421 A | * | 5/2007 |
| WO | WO0133256 | | 5/2001 |
| WO | WO2005096015 | | 10/2005 |
| WO | WO2005096018 | | 10/2005 |
| WO | WO2005096019 | | 10/2005 |

* cited by examiner

*Primary Examiner*—Dan Pihulic
(74) *Attorney, Agent, or Firm*—Jeffrey E. Griffin; Liangang (Mark) Ye (57) ABSTRACT

A method for controlling timing error in the firing of an idle seismic air gun comprises the steps of identifying an acceptable range of seismic air gun timing error, and identifying a relationship between seismic air gun timing error and an idle period preceding a seismic air gun firing event. The first firing event time following an idle period is then compensated according to the identified relationship to control the timing error within the identified acceptable range. The invention may be implemented using computer means such as machine-readable storage media. The invention may be applied to advantage when air gun firing delays are experienced, such as during selective changes from one air gun group to another air gun group for purposes of achieving a desired center-of-source position.

18 Claims, 9 Drawing Sheets

MARINE SEISMIC AIR GUN TIMING

BACKGROUND OF THE INVENTION

The present invention relates to marine seismic sources used in the acquisition of seismic data in a marine environment, and more particularly to the control of timing errors associated with the firing of marine seismic sources.

DEFINITIONS

Certain terms are defined throughout this description as they are first used, while certain other terms used in this description are defined below:

"Empirical evidence" means information or data that is based on observation or experience, including near-real time (e.g., immediately prior) experience.

"Idle" or "idle period" means a duration of time exceeding the sum of two or more typical air gun firing cycles, during which an air gun is not fired.

"Sail line" or "survey line" means the pre-designated two-dimensional coordinates for a seismic vessel and (generally) its towed components to occupy while conducting a portion of a marine seismic acquisition survey.

SUMMARY OF THE INVENTION

Various needs, problems, and deficiencies in the art are addressed by the present invention in its various aspects and embodiments. In one aspect, the present invention provides a method for controlling timing error in the firing of an idle seismic air gun. The inventive method comprises the steps of identifying an acceptable range of seismic air gun timing error (e.g., substantially +/−1 ms), and identifying a relationship between seismic air gun timing error and an idle period preceding a seismic air gun firing event. The first firing event time following an idle period is then compensated according to the identified relationship to control the timing error within the identified acceptable range. Optionally, the first few firing event times (e.g., first, second, and third) following an idle period may each be compensated according to the identified relationship as needed to control the timing error within the identified acceptable range.

The relationship between air gun timing error and the idle period preceding a seismic air gun firing event may be pre-determined by evaluation of empirical evidence. The evaluation of empirical evidence may indicate, e.g., that the air gun timing error generally stabilizes or increases with increasing idle period duration.

The evaluation of empirical evidence may further result in the identification of a threshold idle period below which the air gun timing error will likely remain within the identified acceptable range of air gun timing error. Accordingly, the compensating step may comprise advancing the first firing event time according to the identified acceptable range of air gun timing error, as constrained by the threshold idle period.

In another aspect, the present invention provides an article for controlling timing error in the firing of an idle seismic air gun, comprising one or more machine-readable storage media. The storage media contain instructions that when executed enable a computer to identify a relationship between seismic air gun timing error and an idle period preceding a seismic air gun firing event, and compensate a first air gun firing event time following an idle period according to the identified relationship to control the timing error within a given acceptable range of air gun timing error.

In particular embodiments of the inventive article, the one or more machine-readable storage media contain instructions that when executed enable a computer to identify a threshold idle period below which the air gun timing error will likely remain within the acceptable range of air gun timing error, and advance the first firing event time according to the acceptable range of air gun timing error, as constrained by the threshold idle period.

In a further aspect, the present invention provides a method of firing seismic air guns towed through a body of water by a marine vessel. The inventive method comprises the steps of identifying an acceptable range of timing error for the towed seismic air guns, and identifying a relationship between seismic air gun timing error and an idle period preceding a seismic air gun firing event, so as to predict a threshold idle period below which the air gun timing error will likely remain within the identified acceptable range. The method further comprises determining a desired center-of-source position, which may be based upon at least one of a depth and a sail line, and selecting one of a plurality of towed seismic air gun groups to function as a composite seismic source based upon proximity of the respective air gun group centers to the desired center-of-source position. The composite seismic source is then fired according to the identified acceptable range of air gun timing error, the predicted threshold idle period, and the position of the composite seismic source center relative to the desired center-of-source position. The firing step may comprise, e.g., advancing the first firing event time following an idle period according to the identified acceptable range of air gun timing error.

In particular embodiments of the inventive method, the selecting step comprises predicting which one of the towed air gun group centers will be closest to the desired center-of-source upon expiration of the predicted threshold idle period. Accordingly, the firing step comprises firing the predicted closest air gun group before expiration of the predicted threshold idle period.

In other embodiments of the inventive method, the selecting step comprises predicting which two of the towed air gun group centers will be closest to the desired center-of-source upon expiration of the predicted threshold idle period. Accordingly, the firing step comprises toggled firing of the predicted two closest air gun groups before expiration of the predicted threshold idle period.

The selecting step may be constrained by the prior sequence of selecting towed seismic air gun groups to function as a composite seismic source. Accordingly, the selecting step may employ dead-band conditions to prevent erratic changes between towed air gun groups. Similarly, the selecting step may comprise predicting required changes in the desired center-of-source positions, and postponing changes between towed air gun groups as constrained by overshoot limits.

Each towed air gun group may comprise an air gun that is not contained in any other towed air gun group. Additionally, two or more towed air gun groups may comprise at least one common air gun.

BRIEF DESCRIPTION OF THE DRAWINGS

A more particular description of the invention, briefly summarized above, is provided by reference to embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1A:
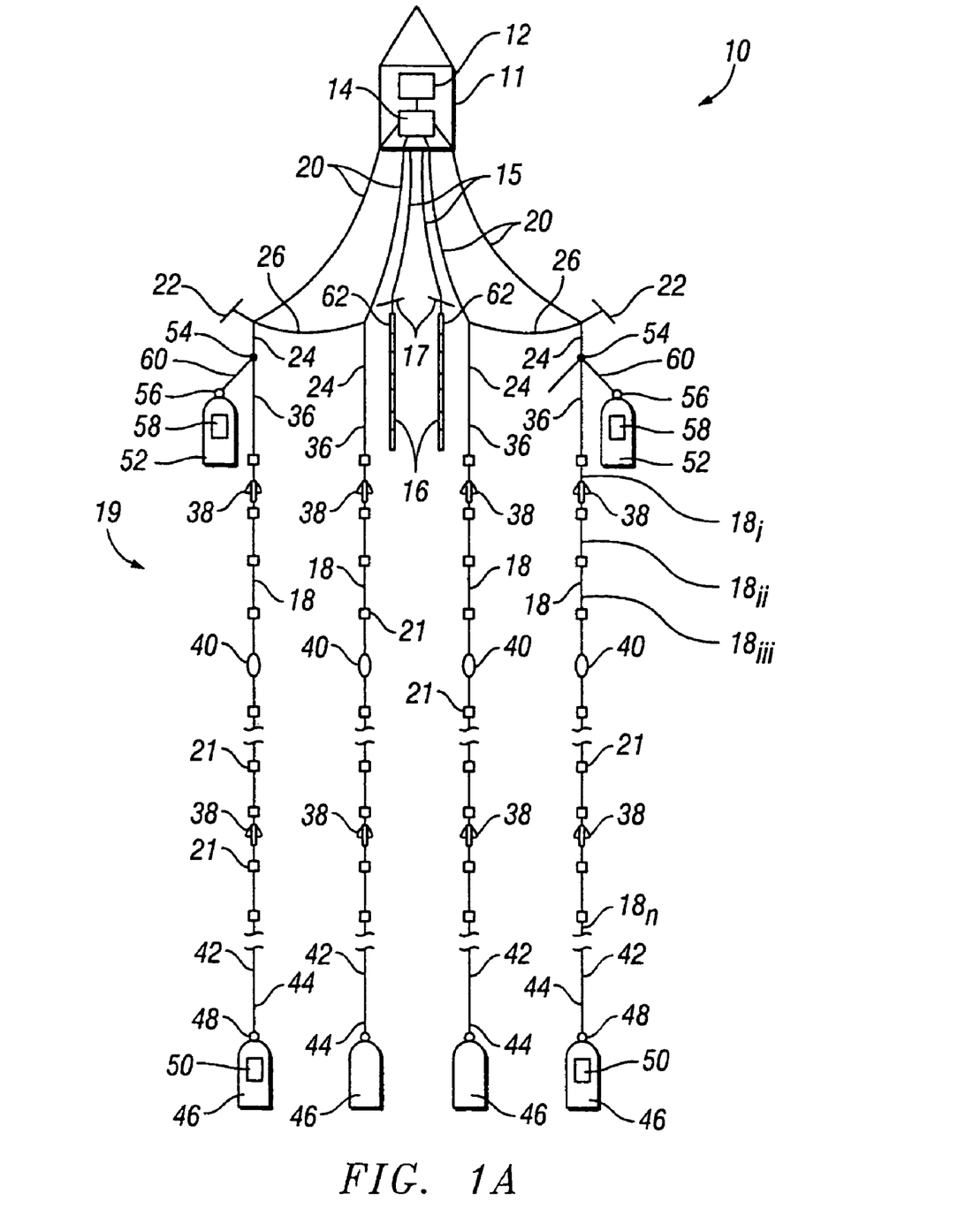
FIG. 1A is a schematic representation, in plan view, of a particular seismic survey spread.
Figure 1B:
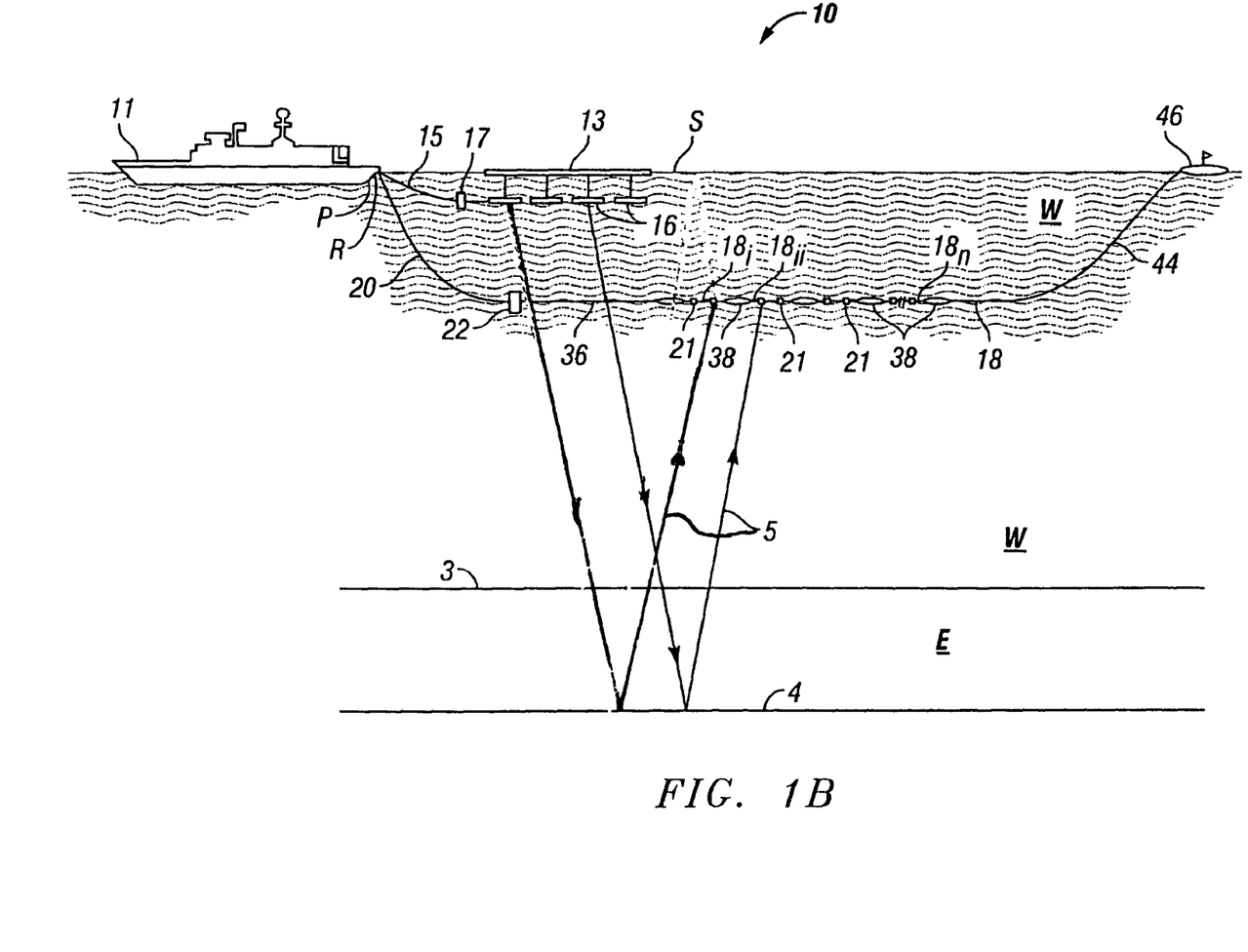
FIG. 1B is a schematic representation, in elevational view, of the seismic survey spread of FIG. 1A.

FIGS. 1A-1B illustrate a particular marine seismic acquisition survey spread (also known simply as a "spread") 10 for performing 3D or 4D surveys in accordance with the proprietary commercial offerings of WesternGeco, the assignee of the present invention. The spread 10 will now be described as an example of a seismic acquisition spread or system with which the present invention may be employed to advantage. Those having ordinary skill in the art will appreciate, however, that the present invention is not limited to use with this particular spread 10. Thus, the present invention has utility in a number of other seismic acquisition systems, some of which are described or suggested below in association with FIGS. 4-7.

The spread 10 is characterized by a plurality of components, some of which are controllable and known as spread control components. The spread control components typically include a vessel rudder R, a vessel propeller P, a vessel thruster (not shown), and one or more towed devices for steering the various components that otherwise make up the spread 10.

More particularly, in the case of a Q™ vessel owned and operated by WesternGeco, the vessel 11 is provided with a GPS receiver 12 coupled to an integrated computer-based seismic navigation (TRINAV™), source controller (TRISOR™), and recording (TRIACQ™) system 14 (collectively, TRILOGY™), and tows a plurality of seismic sources 16, typically a TRISOR™-controlled multiple air gun source of the kind described in U.S. Pat. No 4,757,482, and an array 19 of four or more substantially identical streamers 18. It will be appreciated by those having ordinary skill in the relevant art that, in practice, as many as twenty streamers can be towed, for example by using the techniques described in U.S. Pat. No. 6,498,768 assigned to WesternGeco. The streamers 18 are towed by means of their respective lead-ins 20 (i.e., the high strength steel or fiber-reinforced cables which convey electrical power, control, and data signals between the vessel 11 and the streamers 18). The span of the outer-most streamers 18 is controlled by two steerable front-end deflectors (SFEDs) called MONOWING™ deflectors, indicated at 22, connected to the respective forward ends 24 of the two or more outer-most streamers. The SFEDs 22, which are described in detail in U.S. Pat. No. 5,357,892 assigned to WesternGeco, act in cooperation with respective spreader lines 26 connected between the forward end 24 of each outer-most streamer 18 and the forward end 24 of its adjacent streamer to assist in maintaining a substantially uniform spacing between the streamers 18.

Each streamer 18 includes a plurality (up to 4000) hydrophone sensors 21 distributed at spaced intervals along the streamer's length. Each of the hydrophones 21 is separately wired so that its output signal can be separately digitized and filtered, thereby permitting sophisticated processing known as digital group forming, as described in U.S. Pat. No. 6,684,160 assigned to WesternGeco.

Each streamer 18 includes a large number of substantially identical "active" streamer sections $18_i$, $18_{ii}$, $18_{iii}$, ... $18_n$ each approximately 100 meters in length and connected together end to end. Each active streamer section comprises an outer plastic skin that contains several elongate stress members, e.g., made of Kevlar, and the hydrophones 21 which are separated by kerosene-saturated plastic foam spacer material, as described in U.S. Pat. No. 6,477,111 assigned to WesternGeco. Alternatively, the active streamer sections may employ a "solid" construction, a fiber optic-based configuration, or other configurations that are known to those having ordinary skill in the art.

The streamers 18 further may have a plurality of inline streamer steering devices (SSDs) 38, also known as "birds," such as Q-FIN™ birds of the kind described in U.S. Pat. No. 6,671,223, also assigned to WesternGeco, distributed at appropriate intervals, e.g., 200 m, therealong for controlling the streamer's depth and steering it laterally. Additionally, each streamer 18 has inline acoustic emitters or "pingers" 40 distributed therealong, the pingers being interleaved between the birds 38. The pingers 40 are part of a positioning and navigation system, and their operation is described in U.S. Pat. Nos. 4,992,990 and 5,668,775, both assigned to WesternGeco.

Each streamer 18 may be further equipped with forward (36) and rear (44) sections commonly known as "stretch" or "vibration-isolation" sections. The forward stretch sections 36 function to mechanically decouple the streamer 18 from the vessel 11, thereby preventing the application of undesirable jerking forces from the vessel 11 to the streamer 18, which would introduce substantial noise to the recorded seismic data signals. The rear stretch sections 44 function similarly with respect to the tail buoys 46, which could otherwise impose drag-induced jerking forces. The stretch sections are similar to the active streamer sections in that the stretch sections include an outer plastic skin, conducting wires, and floatation means. The stretch sections differ, however, in that they usually carry no hydrophones and lack the elongate stress members of the active sections, although elastic stress members, such as polyamide-fiber rope, form part of each stretch section to restrict its total stretch within preselected limits. A typical stretch section may be 50-250 meters long, and is capable of stretching nearly twice its own length.

The rearward ends 42 of the streamers 28, i.e., the ends remote from the vessel 11, are connected via the respective rear stretch sections 44 to respective tailbuoys 46. The tailbuoys are provided with respective pingers 48, similar to the pingers 40, and respective GPS receivers 50.

The streamer array 19 is further provided in the region of its forward end 24 with additional buoys or floats 52. More specifically, the further floats 52 are respectively connected to the streamers 18, often the four outermost streamers, at respective watertight electro-optical "tee" connectors 54 positioned between the two stretch sections 36 at the forward ends 24 of the outermost streamers, so as to be towed by the streamers. The buoys 52, which can be substantially identical to the tailbuoys 46, are provided with respective pingers 56 and GPS receivers 58, and are connected to their respective connectors 54 by respective stretch sections 60. Although the buoys 52 are shown in FIG. 1A as offset with respect to their streamers for clarity, in practice they are substantially in line with the streamers 18.

The seismic sources 16 may also be provided with a GPS receiver, indicated at 62, and an acoustic receiver such as a hydrophone 21 (not shown among the sources 16). The sources 16 may be steerable via steering devices 17, such as the devices described in U.K. Patent Application No. GB 0307018.2 assigned to WesternGeco.

Thus, when performing a seismic acquisition survey with a Q™ vessel as described above, the seismic sources 16 and the seismic streamer array 19 are deployed from the vessel 11 and towed at about 5 knots substantially in the configuration shown in FIGS. 1A and 1B. The seismic sources 16 are periodically fired, e.g., every 10 seconds or so, emitting seismic energy in the form of an acoustic wave to the water, resulting in one or more wavefields that travel coherently into the earth E underlying the water W (see FIG. 1B). As the wavefields strike interfaces 4 between earth formations, or strata, they are reflected back through the earth E and water W along paths 5 to the various hydrophones 21, where the wavefields (e.g., pressure waves in the case of air gun sources) are converted to electrical signals, digitized, and transmitted to the recording/processing system 14 (see FIG. 1A) in the vessel 11 via the streamers 18 and lead-ins 20. Through analysis of these detected signals, it is possible to determine the shape, position and lithology of the sub-sea formations, including those formation that are likely to contain hydrocarbon deposits.

The representation of the sub-sea formations in the survey area is formed by combining data collected along a plurality of sail lines. Ideally, the sail lines are approximately straight lines that extend along or across a portion of the survey area. However, persons of ordinary skill in the art will appreciate that the sail lines are rarely, if ever, perfectly straight. Wind, water currents, waves, steering of the survey vessel, and the like will typically cause the sail line to be less than perfectly linear. Furthermore, the seismic data may be collected along paths that are purposefully non-linear. For example, it may be desirable to repeat the non-linear sail lines of a prior seismic survey for purposes of time-lapse comparison, also known as a 4D survey. Non-linear sail lines may exhibit shapes including elliptical paths, circular paths, and Figure-8 paths, among others.

In one embodiment, a single survey vessel may tow a single receiver array along each of the sail lines. Alternatively, a plurality of survey vessels may tow a plurality of receiver arrays along a corresponding plurality of the sail lines. In various alternative embodiments, the data may be collected during a single survey conducted over a short period of time, e.g. approximately one day, or it may be collected in multiple surveys performed a different times. For example, inclement weather and/or high seas may force a survey to be suspended before resuming hours or days later. For another example, historical data from previous surveys performed months or years earlier may be combined with new data to extend the survey or to fill in deficiencies in coverage that may be introduced by currents, obstacles such as platforms, and the like. And for yet another example, data from repeat surveys may be used to analyze and monitor changes in productive oil and/or gas reservoirs.

The accuracy and/or resolution of the representation formed using the acquired data may be limited by uncertainties in the actual path of the seismic source and/or the receivers through the water. Accordingly, the survey vessel typically attempts to tow the seismic source so that a geometric center-of-source of the guns in the seismic source follows a desired sail line. However, the center-of-source rarely, if ever, precisely follows the desired sail line. For example, water currents, wind, waves, and the like may divert one or more guns in the seismic source from the desired path.

A problem encountered in marine surveying relates to the activation or firing of one or more seismic air gun sources that have been idle, such as occurs when switching between groups of air guns to define a desirable center-of-source position. When a group of idle air guns is fired, there is an increased risk of error (e.g., a delay) between the expected firing time and the actual firing time, commonly known as a timing error. Such timing error is a contributor to changes in the so-called "signature" of a seismic source (or a group of sources). Seismic acquisition operations typically allow for some degree of timing error by specifying an acceptable timing error range, such as, e.g., +/−0.5 ms to +/−1.5 ms.

Figure 2A:
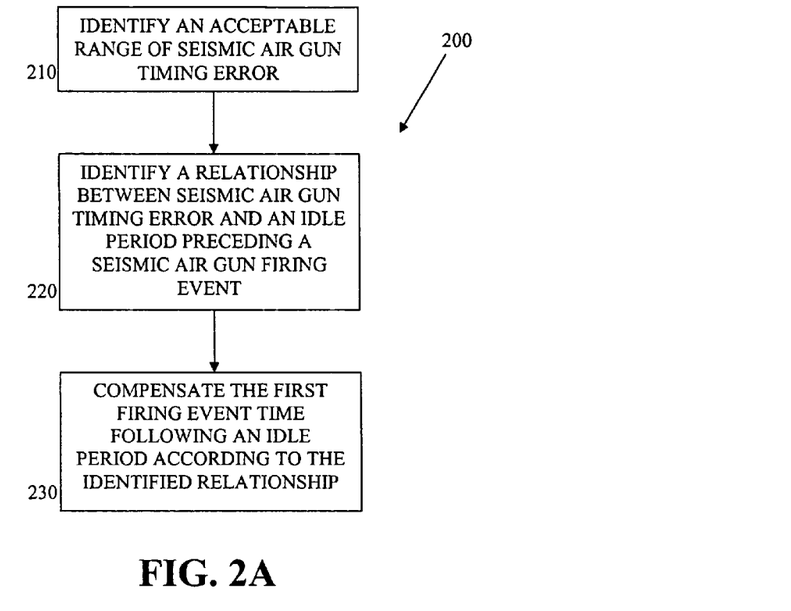
FIG. 2A is a flow chart representation of a method for controlling timing error in the firing of an idle seismic air gun towed through a body of water by a marine vessel.

FIG. 2A is a flow chart representation of a method 200 for controlling timing error in the firing of an idle seismic air gun (like one or more air guns 16 of FIGS. 1A-1B) towed through a body of water by a marine vessel (like vessel 11 of FIGS. 1A-1B). The inventive method 200 comprises the step 210 of identifying an acceptable range of seismic air gun timing error, and the step 220 of identifying a relationship between seismic air gun timing error and an idle period preceding a seismic air gun firing event. The first firing event time following an idle period is then compensated in step 230 according to the identified relationship to control the timing error within the identified acceptable range. Optionally, the first few firing event times (e.g., first, second, and third) following an idle period may each be compensated according to the identified relationship as needed to control the timing error within the identified acceptable range.

Figure 2B:
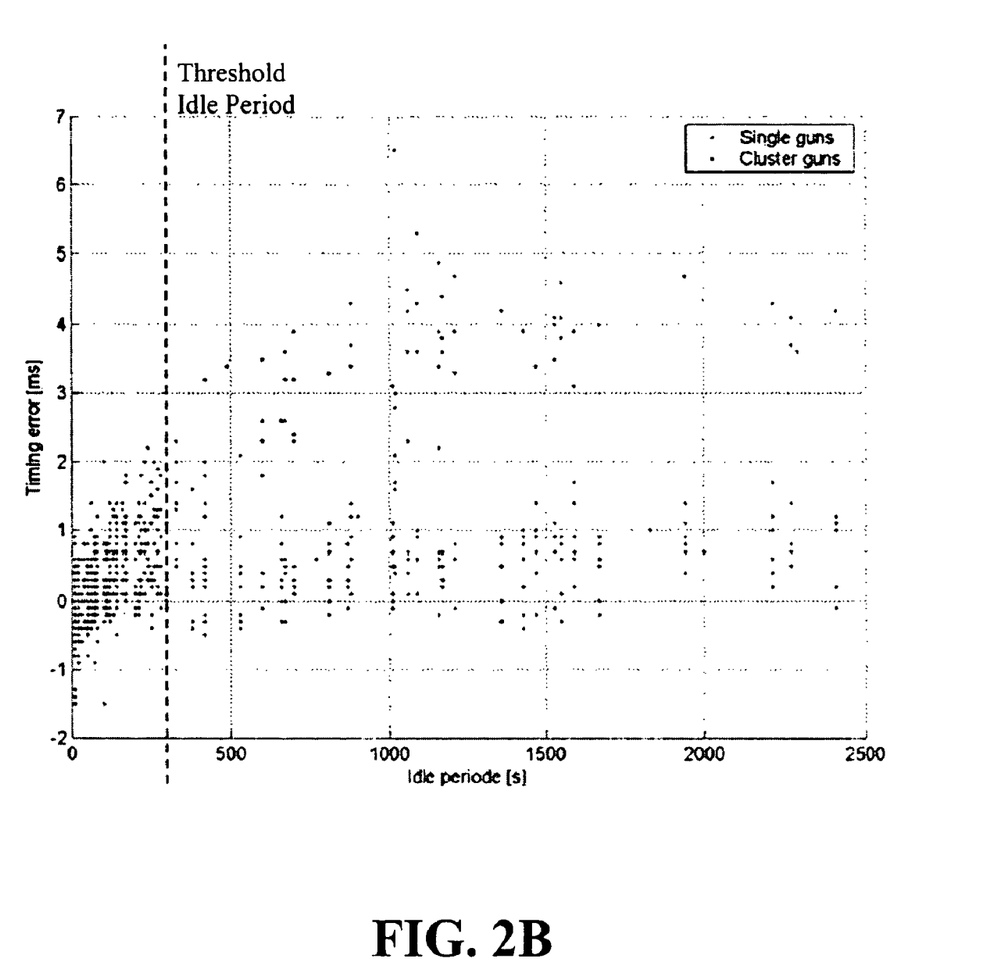
FIG. 2B is a plot of empirical data for air gun timing error versus idle period preceding a seismic air gun timing event.
Figure 3:
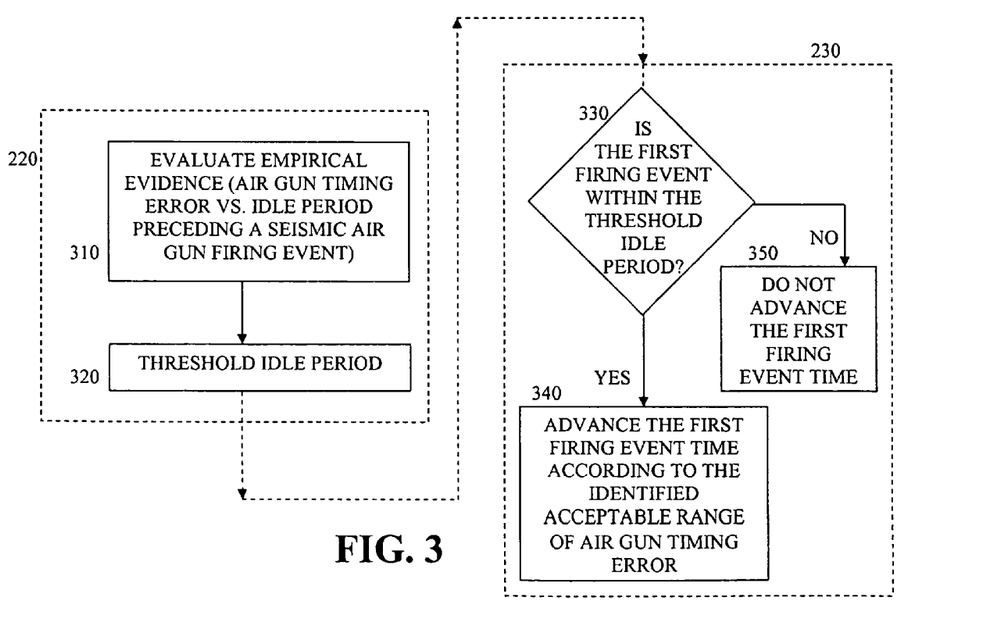
FIG. 3 is a more detailed flow chart representation of two of the method steps depicted in the flow chart of FIG. 2A.

Step 220 is expanded in FIG. 3 as the step 310 of evaluating empirical evidence concerning the relationship between air gun timing error and the idle period preceding a seismic air gun firing event. With reference also to the plot of FIG. 2B, this evaluation of empirical evidence may indicate, e.g., that the air gun timing error generally stabilizes or increases with increasing idle period duration. The evaluation of empirical evidence may further result in the identification of a threshold idle period below which the air gun timing error will likely remain within the identified acceptable range of air gun timing error. Such a threshold idle period is shown by the broken line at or about the 300 second mark for idle period in FIG. 2B, since most of the plotted points remain within the given range of acceptable seismic air gun timing error (e.g., substantially +/−1 ms) for a tested air gun.

Step 230 is also expanded in FIG. 3, which shows that the compensating step may comprise the step 340 of advancing the first firing event time according to the identified acceptable range of air gun timing error, as constrained by the threshold idle period (step 330). Thus, if the first firing event time is within the threshold idle period, the first firing event time will be advanced by an amount equal to the identified acceptable range of air gun timing error. If, on the other hand, the first firing event time is not within the threshold idle period, the first firing event time will not be advanced (step 350), but may be compensated in other ways, e.g., using the "controlled marine source" processes described in U.S. Pat. Nos. 4,476,553 and 4,868,794 (both assigned to WesternGeco), as are known to those having ordinary skill in the art.

Figure 4:
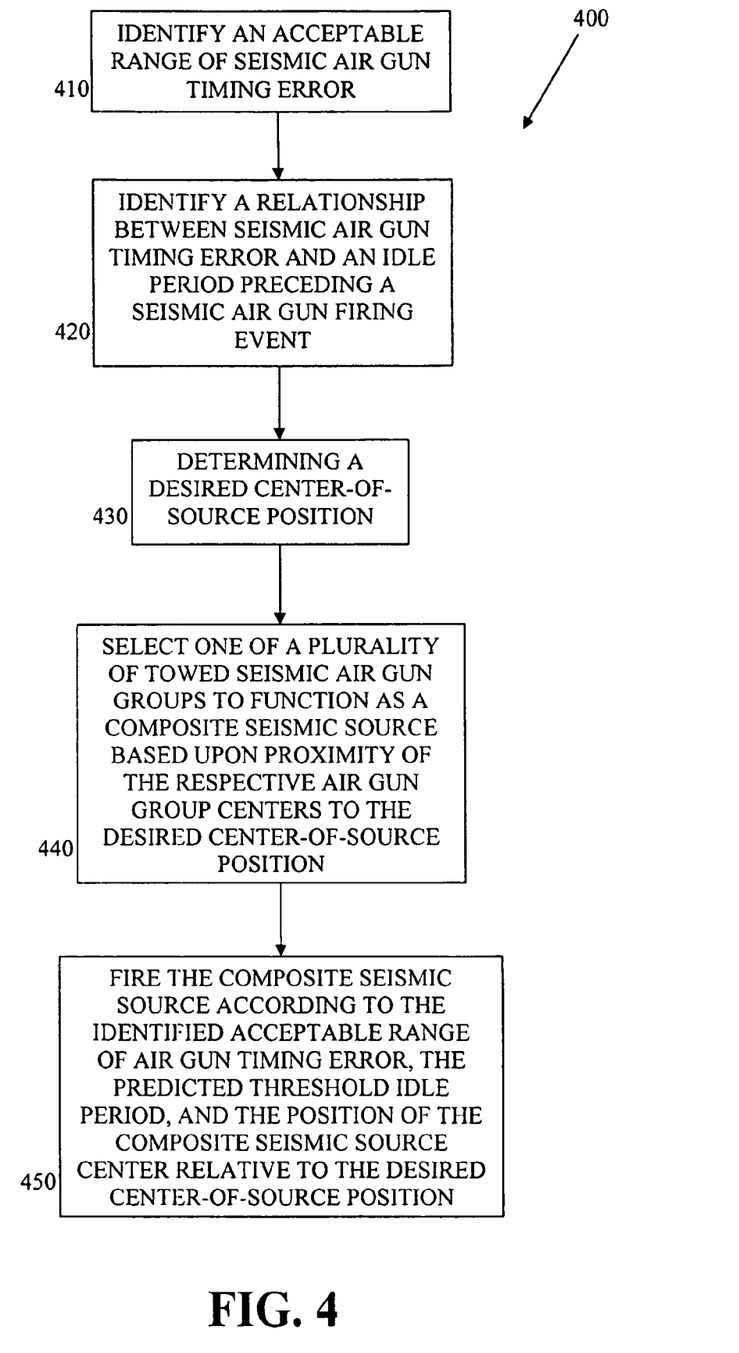
FIG. 4 is a flow chart representation of a method for controlling timing errors in the firing of an idle seismic air guns towed through a body of water by a marine vessel while selectively firing the air guns to maintain a desired center-of-source position.

FIG. 4 is a flow chart representation of a method 400 for controlling timing errors in the firing of an idle seismic air guns towed through a body of water by a marine vessel while selectively firing the air guns to maintain a desired center-of-source position. The inventive method 400 comprises the step 410 of identifying an acceptable range of timing error for the towed seismic air guns, and the step 420 of identifying a relationship between seismic air gun timing error and an idle period preceding a seismic air gun firing event, so as to predict a threshold idle period below which the air gun timing error will likely remain within the identified acceptable range. Thus, steps 410 and 420 are very similar to steps 210 and 220 described above in reference to FIG. 2A.

The method 400 further comprises the step 430 of determining a desired center-of-source position, which may be based upon, e.g., at least one of a depth and a sail line, and the step 440 of selecting one of a plurality of towed seismic air gun groups to function as a composite seismic source based upon proximity of the respective air gun group centers to the desired center-of-source position.

The composite seismic source is then fired in step 450 according to the identified acceptable range of air gun timing error, the predicted threshold idle period, and the position of the composite seismic source center relative to the desired center-of-source position. The firing step may comprise, e.g., advancing the first firing event time following an idle period according to the identified acceptable range of air gun timing error.

In particular embodiments of the inventive method, which will be described further below, the composite seismic source-selecting step comprises predicting which one of the towed air gun group centers will be closest to the desired center-of-source upon expiration of the predicted threshold idle period. Accordingly, the firing step may comprise firing the predicted closest air gun group before expiration of the predicted threshold idle period. The term "closest" as used herein may, in some circumstances, be determined by factors other than merely the shortest geometrical distance. Thus, e.g., it may be more desirable to select a composite source based upon its in-line proximity to a desired center-of-source, even though another composite seismic source is actually geometrically nearer to the desired center-of-source when measured in a cross-line or a vertical (depth) direction.

Figure 5:
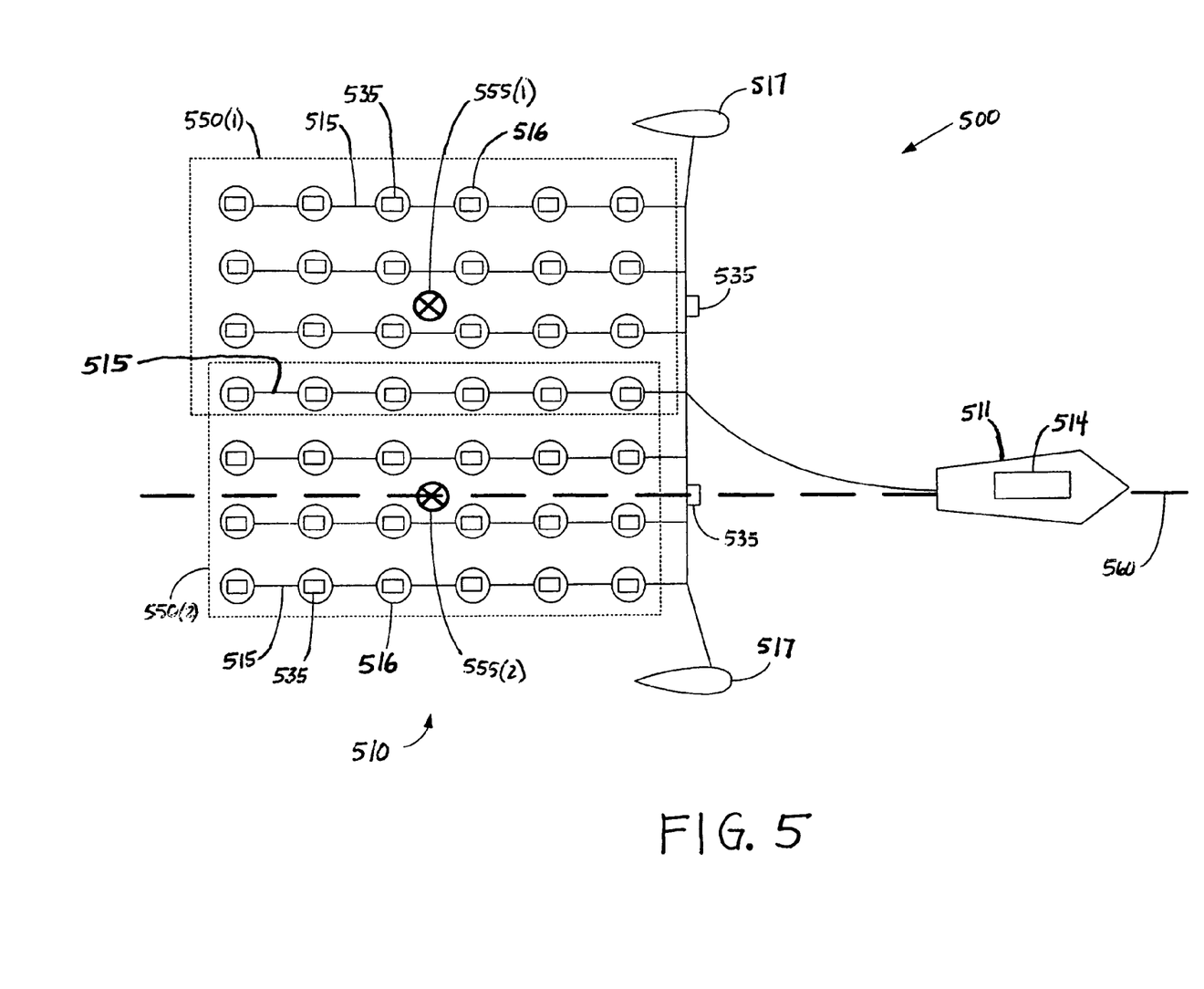
FIG. 5 schematically illustrates a system for selectively firing seismic air guns to maintain a desired center-of-source position horizontally, at a desired cross-line position.

FIG. 5 schematically illustrates a seismic spread or system 500 for selectively firing seismic air guns to maintain a desired center-of-source position horizontally, at a desired cross-line position. The system 500 includes a survey vessel 511 coupled to a seismic air gun array 510 formed of a plurality of cables 515 having a plurality of air guns 516 attached thereto. The gun array 510 shown in FIG. 5 is a two-dimensional array. However, in alternative embodiments such as described below, the gun array 510 may also be one-dimensional or three-dimensional. Persons of ordinary skill in the art will appreciate that the cables 515 are also commonly referred to using terms such as "seismic streamers," "strings," and the like. Persons of ordinary skill in the art should also appreciate that, in alternative embodiments, the system 500 may also include a plurality of seismic receivers as well as other spread control components (like those shown in FIGS. 1A-1B).

In the illustrated embodiment, the gun array 510 includes seven source-bearing cables 515. However, the present invention is not limited to seven cables 515 and, in alternative embodiments any desirable number of cables 515 may be used. Persons of ordinary skill in the art will appreciate that the desirable number of cables 515 may be influenced by such factors as the size of the survey vessel 511, the capabilities of one or more engines (not shown) that power the survey vessel 511, the drag of the gun array 510, the area of the survey region, and the like.

The cables 515 shown in FIG. 5 are deployed with an approximately equal separation in the cross-line direction. However, in alternative embodiments, any desirable cable spacing may be selected, including unequal spacing between the cables 515. Furthermore, persons of ordinary skill in the art will appreciate that, in operation, the spacing of the cables 515 may be affected by factors including wind, water currents, waves, the heading and/or speed of the survey vessel 511, and the like.

The air guns 516 shown in FIG. 5 are approximately equally spaced in the in-line direction. However, persons of ordinary skill in the art will appreciate that the present invention is not limited to equally-spaced guns 516. In various alternative embodiments, the guns 516 may be spaced in any desirable manner, including unequal spacing in the in-line direction.

Each of the plurality of guns 516 is communicatively coupled to a controller 514, which may be deployed on the survey vessel 511. The controller 514 is capable of providing one or more signals to selected subpluralities of the plurality of guns 516. The provided signals may be used to initiate a seismic shot from the guns 516 in the selected subpluralities. Persons of ordinary skill in the art will appreciate that the guns 516 may be communicatively coupled to the controller 514 in any desirable manner known to the art including, but not limited to, wires deployed in the plurality of cables 515, radiofrequency transceivers (not shown), and the like. For example, one function of the cables 515 may be to transmit command and control information from the controller 514 to the guns 516.

In one embodiment, each gun 516 is individually communicatively coupled to the controller 514 so that the controller 514 may provide a separate signal to initiate firing each gun 516. Alternatively, subsets or groups of the guns 516 may be communicatively coupled to the controller 514 so that the controller 514 may provide a single signal to initiate firing the guns 516 in the selected groups at substantially the same time. For example, the guns 516 deployed along each of the plurality of cables 515 may be communicatively coupled to the controller 514 so that the controller 514 may provide a single signal to initiate firing the guns 516 deployed along a selected cable 515.

The guns 516 may be fired at the same time to generate the seismic shot. However, the present invention is not limited to simultaneously firing the guns 516. In alternative embodiments, the guns 516 may be fired at different times. For example, a timing skew of a few milliseconds between firings of the guns 516 may be introduced to control the direction of the energy of the seismic shot. In one embodiment, the controller 514 determines the timing skew and provides one or more signals to initiate firing of the guns 516 in the appropriate temporal sequence.

The plurality of guns 516 in the gun array 510 may thus be configured to form one or more air gun groups 550(1-2), each having a plurality of air guns therein that may be collectively controlled by the controller 514 to fire as composite seismic sources. In the illustrated embodiment, a center-of-source 555(1) (indicated by a crossed circle in FIG. 5) of the configuration of guns 516 used to form the first air gun group 550(1) is different than a center-of-source 555(2) (also indicated by a crossed circle in FIG. 5) of the configuration of guns 516 used to form the second air gun group 550(2). For example, the centers-of-source 555(1-2) may be different because each seismic source 550(1-2) includes at least one gun 516 that is not found in the other seismic source 550(1-2). However, it will be appreciated that, in alternative embodiments, any desirable technique for making the center-of-source 555(1) of the first air gun group 550(1) different than the center-of-source 555(2) of the second air gun group 550(2) may be used.

In the illustrated embodiment, the seismic air gun groups 550(1-2) also include guns 516 that are common to the two air gun groups 550(1-2) (see the central cable 515). However, persons of ordinary skill in the art will appreciate that the present invention does not require that the air gun groups 550(1-2) include guns 516 that are common to the two air gun groups 550(1-2). Moreover, if more than one gun array 510 is used, the guns 516 may not even be a part of the same gun array 510. Furthermore, it should be appreciated that the guns 516 may be associated with any desirable number of seismic air gun groups 550(1-2). For example, the guns 516 may be associated with more than two air gun groups.

One or more positioning devices 535 are deployed proximate the gun array 510. In the illustrated embodiment, a positioning device 535 is coupled to each gun 516. However, persons of ordinary skill in the art will appreciate that, in alternative embodiments, not all of the guns 516 will be coupled to a positioning device 535. Moreover, the positioning devices 535 may not always be coupled to the guns 516. For example, the positioning devices 535 may be coupled to the cable 515 proximate the guns 516, or at any other desirable position along one or more of the cables 515. In one embodiment, the positioning devices 535 are Global Positioning System devices (e.g., GPS satellite receivers). However, in alternative embodiments, the positioning devices 535 may be inertial positioning devices, acoustic positioning devices, and the like.

The positioning devices 535 provide information indicative of their position to the controller 514. The provided positioning information may indicate the absolute position of the positioning device 535. For example, the positioning device 535 may be a Global Positioning System device capable of providing information indicative of the longitude and latitude of the positioning device 535. Alternatively, the positioning device 535 may indicate the relative position of the positioning device 535. For example, the positioning device 535 may provide information indicative of the location of the positioning device 535 relative to the survey vessel 511, one or more other positioning devices 535, or any other desirable reference point. In yet another alternative embodiment, the positioning device 535 may indicate both the absolute position and the relative position of the positioning device 535.

The controller 514 determines the location of the center-of-source 555(1-2) of each of the seismic air gun groups 550(1-2) using the positioning information provided by the positioning devices 535. In one embodiment, the controller 514 may compute the center-of-source 555(1-2) using the position information provided by each of the positioning devices 535 deployed proximate the guns 516. For example, the controller 514 may compute the center-of-source 555(1-2) such that a vector sum of vectors (not shown) from the center-of-source 555(1-2) to each positioning device 535 is minimized and/or reduced to approximately zero. Alternatively, the controller may compute the center-of-source 555(1-2) using a known relation between the positioning devices 535 and the center-of-source 555(1-2). For example, the positioning devices 535 may be deployed such that the center-of-source 555(1-2) is separated from the positioning device 535 by approximately a known distance along a direction approximately parallel to the cables 515.

The survey vessel 511 may be physically steered to position the gun array 510 approximately above a planned or desirable sail line 560. For example, a heading of the survey vessel 511 may be changed to position the towed gun array 510 approximately above the sail line 560. As discussed above, the location of the sail line 560 may be predetermined to provide a new sail line location to a seismic survey, to revisit a previously surveyed sail line, to provide infill for a current or previous seismic survey, or for any other reason. The path of the gun array 510 may also be physically steered using one or more deflector devices 517 or other spread control devices (see, e.g., description above for FIGS. 1A-1B), as will be appreciated by persons of ordinary skill in the art. In various alternative embodiments, the sail line 560 may be approximately linear or be a portion of a non-linear path such as an elliptical path, a circular path, a figure-8 path, and the like.

Various factors, such as wind, water currents, waves, the heading and/or speed of the survey vessel 511, and the like, may result in the gun array 510 not being accurately positioned above the sail line 560. Accordingly, the controller 514 is capable of selecting one of the air gun groups 550(1-2) such that the corresponding center-of-source 555(1-2) of the selected air gun group 550(1-2) lies approximately along the sail line 560.

In one embodiment, the configuration of the guns 516 used to form the air gun groups 550(1-2) may be pre-determined and the controller 514 may select one of the pre-determined gun configurations to form the air gun groups 550(1-2) such that the corresponding center-of-source 555(1-2) of the selected group 550(1-2) lies approximately along the sail line 560. However, in alternative embodiments, the controller 514 may determine membership of guns 516 within "customized" air gun groups. For example, the controller 514 may use the position information provided by the positioning devices 535 to determine the membership of the guns 516 in the seismic source 550(1) such that the corresponding center-of-source 555(1) of the air gun group 550(1) lies approximately along the sail line 560.

By selecting one of the seismic air gun groups, either from one or more pre-determined groups 550(1-2) or from one or more groups determined by the controller 514, the uncertainty in the position of the corresponding center-of-source 555(1-2) relative to the sail line 560 may be reduced. For example, the uncertainty in the position of the center-ofsource 555(1-2) relative to the sail line 560 in an exemplary gun array 510 having a plurality of cables 510 that are equally separated in a cross-line direction by approximately five meters may be reduced to about a few meters. Consequently, the amount of physical steering required, and the resulting steering noise in the acquired seismic data, may be reduced. Referring back to FIG. 4, the selected air gun group may then be fired according to step 450, so as to mitigate timing error that may have been produced by a delay.

Figure 6:
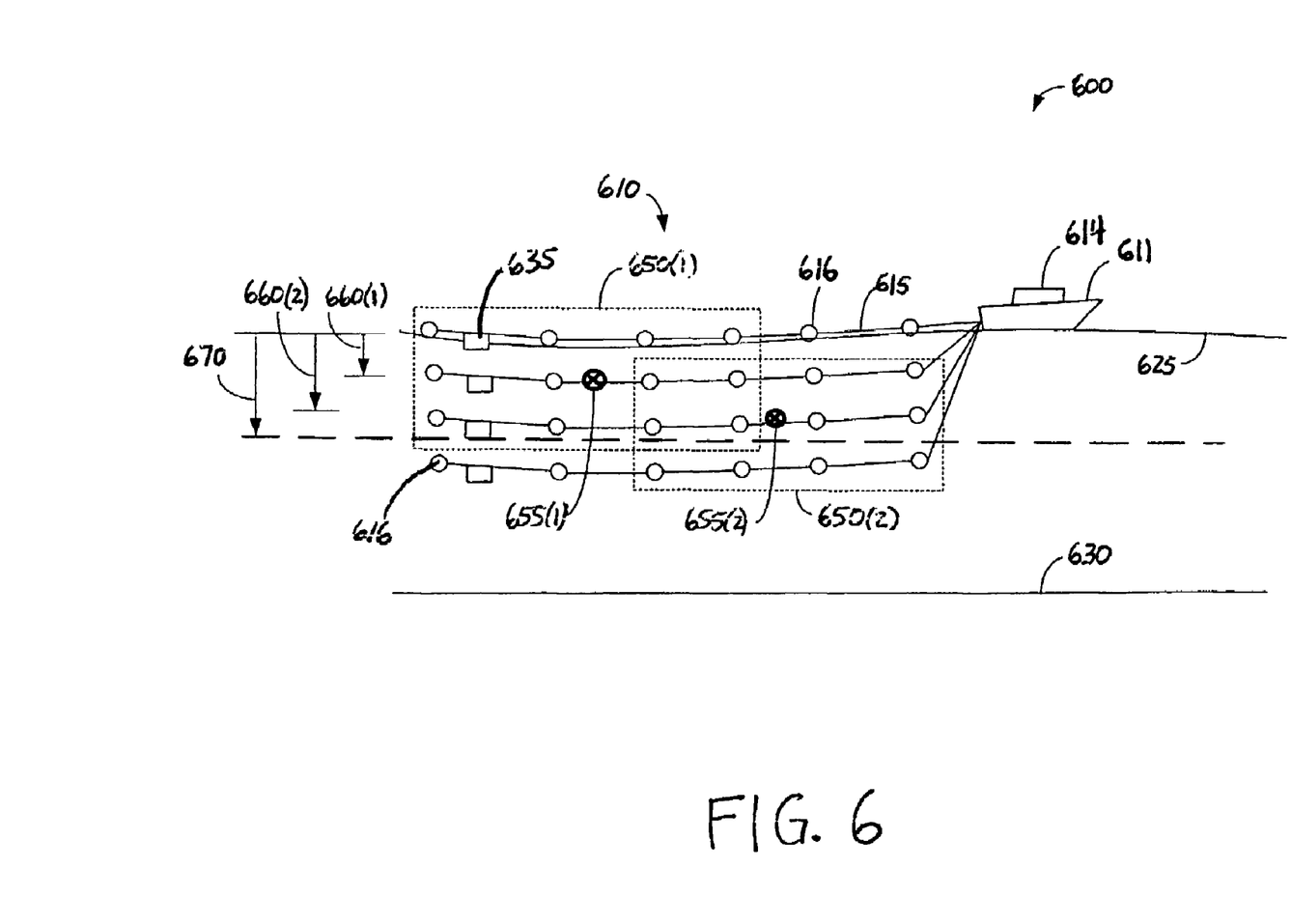
FIG. 6 schematically illustrates a system for selectively firing seismic air guns to maintain a desired center-of-source position vertically, at a desired depth.

FIG. 6 schematically illustrates a seismic spread or system 600 for selectively firing seismic air guns to maintain a desired center-of-source position vertically, at a desired depth. In the system 600, the groupings of guns differ vertically, rather than horizontally. The system 600 includes a survey vessel 611 coupled to a gun array 610 comprising a plurality of cables 615 having a plurality of air guns 616 attached thereto. The plurality of cables 615 are deployed at different depths beneath the surface 625 of a body of water and heights above the floor 630 of the body of water. Although a plurality of cables 615 a shown in FIG. 6, in one alternative embodiment, a single cable 615 having a plurality of guns 616 suspended at different depths below the cable 615 may be used.

In the illustrated embodiment, the system 600 is a two-dimensional gun array 610 oriented in an approximately vertical plane. However, in alternative embodiments, the system 600 may also be a portion of a three-dimensional gun array. Although not shown in FIG. 6, in one alternative embodiment one or more additional pluralities of cables 615 may be distributed in a horizontal direction (i.e. in a direction perpendicular to the page) to form a three-dimensional gun array 610. For example, the system 500 shown in FIG. 5 may be considered as a top-down view of a three-dimensional gun array 610 and the system 600 may be considered a side-view of the three-dimensional gun array 610.

Each of the plurality of guns 616 are communicatively coupled to a controller 614 on the survey vessel 611. As discussed above, the controller 614 is capable of providing one or more signals to selected portions of the plurality of guns 616 that may be used to initiate one or more seismic shots from the guns 616 in the selected portions. The plurality of guns 616 in the seismic source array 615 may be configured to form a plurality of seismic air gun groups 650(1-2). In the illustrated embodiment, a center-of-source 655(1) (indicated by a crossed circle) of the first air gun group 650(1) is different than a center-of-source 655(2) (also indicated by a crossed circle) of the second air gun group 650(2). For example, the center-of-source 655(1) of the first group 650(1) is at a first depth 660(1) that is different than a second depth of 660(2) the center-of-source 655(2) of the second group 650(2) because the air gun groups 650(1-2) each include at least one gun 616 that is not found in the other group 650(1-2). However, as discussed above, the centers-of-source 655(1-2) may differ for any desirable reason and in any desirable direction. For example, in a three-dimensional array 610, the centers-of-source 655(1-2) may differ in both a horizontal and a vertical direction.

One or more positioning devices 635 are deployed proximate the gun array 610. In the illustrated embodiment, the positioning devices 635 are deployed along one or more of the cables 615. In one embodiment, the positioning devices 635 are Global Positioning System devices (e.g., GPS satellite receivers). However, in alternative embodiments, the positioning devices 635 may be inertial positioning devices, acoustic positioning devices, depth detectors, and the like. The positioning devices 635 provide information indicative of their position (i.e. the depth of the corresponding cable 615) to the controller 614. The provided positioning information may also indicate the absolute position (e.g. the latitude and longitude) of the positioning device 635 or, alternatively, the positioning device 635 may indicate the relative location of the positioning device 635 relative to the survey vessel 611, the surface 625, the one or more other positioning devices 635, or any other desirable reference point.

The controller 614 determines the location of the center-of-source 655(1-2) of each of the seismic air gun groups 650(1-2) using the positioning information provided by the positioning devices 635. In various alternative embodiments, it may be desirable to position the center-of-source 655(1-2) proximate a selected depth 670. For example, it may be desirable to position the center-of-source 655(1-2) proximate the selected depth 670 to reduce the effect of one or more ghosts, multiples, and/or other artifacts in the acquired data. Accordingly, the controller 614 is capable of selecting one of the air gun groups 650(1-2) such that the corresponding center-of-source 655(1-2) of the selected groups 650(1-2) is proximate the selected depth 670. As discussed above, the controller 614 may also be capable of selecting a membership and/or a configuration of the guns 616 in one or more air gun groups. By selecting one of the groups 650(1-2), the difference between the depth of the corresponding center-of-source 655(1-2) and the selected depth 670 may be reduced. Consequently, the performance of various ghost removal techniques, multiple removal techniques, and other data processing techniques may be enhanced.

Figure 7A:
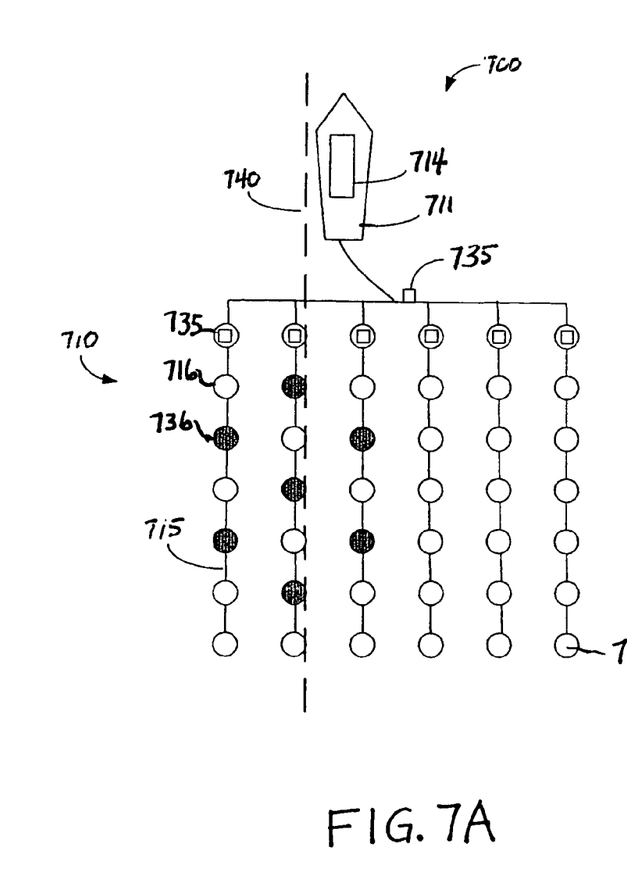
FIGS. 7A and 7B schematically illustrate an alternative system for selectively firing seismic air guns to maintain a desired center-of-source position horizontally, at a desired cross-line position.
Figure 7B:
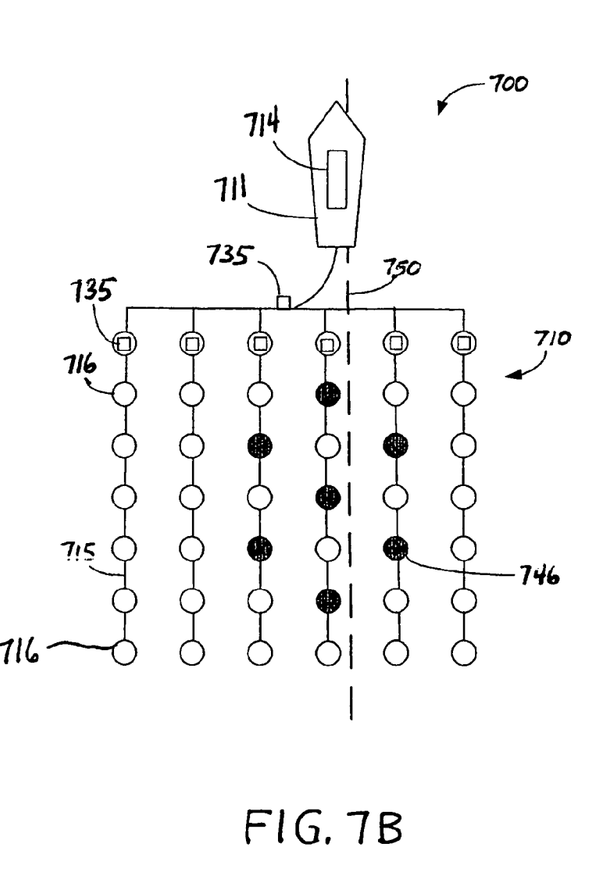

FIGS. 7A and 7B schematically illustrate an alternative seismic spread or system 700 for selectively firing seismic air guns to maintain a desired center-of-source position horizontally, at a desired cross-line position. The system 700 includes a survey vessel 711, which is coupled to a gun array 710 formed using a plurality of cables 715 having a plurality of guns 716 attached thereto. As discussed above, each of the plurality of guns 716 are communicatively coupled to a controller 714, which is capable of providing one or more signals to selected portions of the plurality of guns 716 that may be used to initiate one or more seismic shots from the guns 716 in the selected portions. In various alternative embodiments, one or more positioning devices 735 are deployed proximate the guns 716 and/or along one or more of the cables 715. The positioning devices 735 provide information indicative of their position to the controller 714.

The controller 714 may select a configuration of guns 716 arranged in a predetermined pattern to form a first seismic air gun group 736 (indicated by cross-hatching), as shown in FIG. 7A. For example, the first air gun group 736 may include guns 716 arranged in a center-filled hexagonal pattern, such as may be used in an alternate invariant source array. However, in alternative embodiments, the first air gun group 736 may include guns 716 arranged in any desirable pattern including, but not limited to, a square, a cross, a circle, and the like. As discussed above, the controller 714 may also determine membership of one or more guns 716 in the one or more air gun groups.

The controller 714 may select the first air gun group 736 so that a center-of-source of the first group 736 is proximate a desired sail line 740. As discussed above, the controller may select the first seismic source 736 using information provided by one or more of the positioning devices 735, as well as a predetermined location of the sail line 740.

The controller 714 may alternatively select a second configuration of guns 716 arranged in a predetermined pattern to form a second seismic air gun group 746 (also indicated by cross-hatching), as shown in FIG. 7B. For example, instead of being shifted to the right of the desired sail line 740, as shown in FIG. 7A, the gun array 710 may be shifted to the left of the desired sail line 750, as shown in FIG. 7B, therefore necessitating "correction" of the center-of-source position by selection of the second air gun group 746.

As with the gun array 510, the firing of selected air gun groups of the gun arrays 610 and 710 may then be compensated according to step 450 of FIG. 4, so as to mitigate timing error that may have been produced by a delay.

It will be appreciated by those having ordinary skill in that art that the above-described methods may be applied to select and fire composite seismic sources based upon their proximity to a desired center-of-source in the in-line direction (i.e., along the sail line), in addition to proximity based upon cross-line or vertical directions. In fact, in some cases (e.g., 4D surveys), it may be more important that "closeness" to a desired center-of-source position in the in-line direction is achieved, with closeness in the cross-line or vertical directions being secondary.

Figures 8A, 8B:
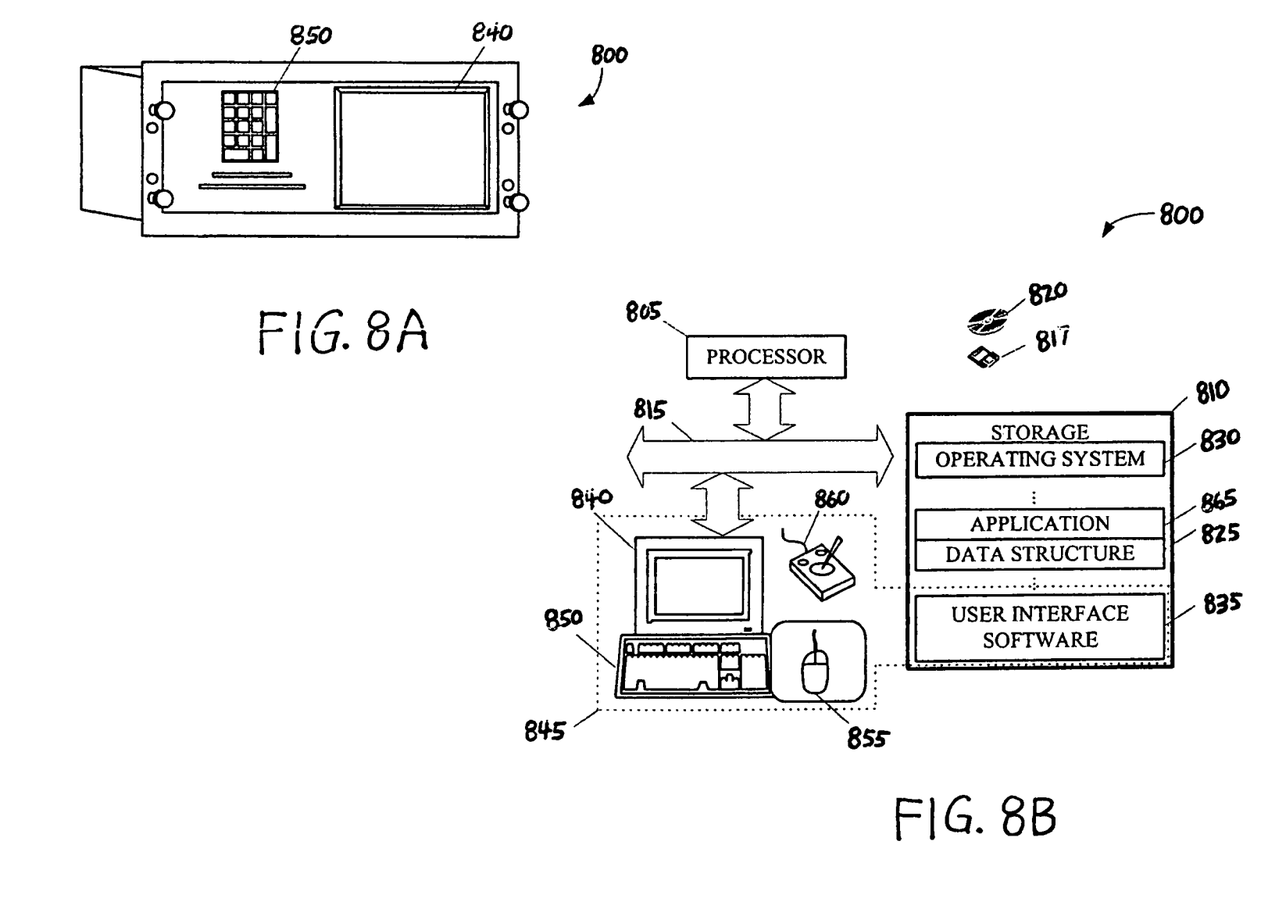
FIGS. 8A and 8B schematically illustrate a computing apparatus that may be used in accordance with the inventive methods disclosed herein.

Referring now to FIGS. 5, 6, 7A, and 7B, the controllers 514, 614, and 714 described above may be embodied, at least in part, in a computing apparatus 800 that may be used to perform the aforementioned operations, as illustrated in FIGS. 8A and 8B. The computing apparatus 800 includes a processor 805 communicating with storage media 810 over a bus system 815. The storage media 810 may include a hard disk and/or random access memory ("RAM"), and/or removable storage media such as a floppy magnetic disk 817 and an optical disk 820. The storage media 810 is encoded with a data structure 825 storing the signals collected as discussed above, an operating system 830, user interface software 835, and an application 865. The user interface software 835, in conjunction with a display 840, implements a user interface 845. The user interface 845 may include peripheral I/O devices such as a key pad or keyboard 850, a mouse 855, or a joystick 860. The processor 805 runs under the control of the operating system 830, which may be practically any operating system known to the art. The application 865 is invoked by the operating system 830 upon power up, reset, or both, depending on the implementation of the operating system 830.

In one embodiment, the computing apparatus 800 may be programmed to perform a method for firing a composite seismic source, such as the exemplary method 400 shown in FIG. 4. Alternatively, the storage media 810 may be encoded with instructions that when executed enable the computing apparatus to perform the exemplary method 400. In the illustrated embodiment of the exemplary method 400, a desired location of a center-of-source may be determined (at 430) based upon a sail line, a depth, a combination of the two, or any other location. A center-of-source of at least one configuration of guns forming a seismic air gun group is then selected (at 440) based upon the proximity of the air gun group to the desired center-of-source location or position.

In one embodiment, a controller, which may be embodied in the computing apparatus 810, determines a plurality of centers-of-sources of a corresponding plurality of gun configurations that may be used to form a plurality of seismic air gun groups. The controller may also determine membership of one or more guns in the one or more seismic air gun groups. The controller then selects (at 430) one of the seismic sources. For example, the controller may select (again, at 440) one of the air gun groups by comparing the desired center-of-source with the determined plurality of centers-of-sources of the corresponding plurality of gun configurations.

In other embodiments of the inventive method, the selecting step (430) comprises predicting which two of the towed air gun group centers will be closest to the desired center-of-source upon expiration of the predicted threshold idle period. Accordingly, the firing step may comprise toggled firing of the predicted two closest air gun groups (e.g., groups 650(1-2) of FIG. 6) before expiration of a predicted threshold idle period.

The selecting step (430) may be constrained by the prior sequence of selecting towed seismic air gun groups to function as a composite seismic source. Accordingly, the selecting step may employ dead-band conditions to prevent erratic changes between towed air gun groups. Similarly, the selecting step may comprise predicting required changes in the desired center-of-source positions, and postponing changes between towed air gun groups as constrained by overshoot limits, i.e., within the bounds of an acceptable positioning error.

It will be appreciated that the computing apparatus 800 may be programmed to perform still further methods, such as the exemplary method 200 shown in FIG. 2A. Alternatively, storage media 810 may be encoded with instructions that when executed enable the computing apparatus to perform the exemplary method 200. In the illustrated embodiment of the exemplary method 200, storage media contain 810 instructions that when executed enable a computer to identify a relationship between seismic air gun timing error and an idle period preceding a seismic air gun firing event (step 220), and compensate a first air gun firing event time following an idle period according to the identified relationship to control the timing error within a given acceptable range of air gun timing error (step 230).

In particular embodiments, the one or more machine-readable storage media contain instructions that when executed enable a computer to identify a threshold idle period below which the air gun timing error will likely remain within the acceptable range of air gun timing error (step 320 of FIG. 3), and advance the first firing event time according to the acceptable range of air gun timing error, as constrained by the threshold idle period (step 340).

Some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

It will be understood from the foregoing description that various modifications and changes may be made in the preferred and alternative embodiments of the present invention without departing from its true spirit.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open set or group. Similarly, the terms "containing," "having," and "including" are all intended to mean an open set or group of elements. "A," "an" and other singular terms are intended to include the plural forms thereof unless specifically excluded. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method for controlling timing error in the firing of an idle seismic air gun, comprising the steps of:
   identifying an acceptable range of seismic air gun timing error;
   identifying a relationship between seismic air gun timing error and an idle period preceding a seismic air gun firing event; and
   compensating the first firing event time following an idle period according to the identified relationship to control the timing error within the identified acceptable range.

2. The method of claim 1, wherein the acceptable range of air gun timing error is substantially +/−1 ms.

3. The method of claim 1, wherein the relationship between air gun timing error and the idle period preceding a seismic air gun firing event is pre-determined by evaluation of empirical evidence.

4. The method of claim 3, wherein the evaluation of empirical evidence indicates that the air gun timing error generally stabilizes or increases with increasing idle period duration.

5. The method of claim 4, wherein the evaluation of empirical evidence indicates that a threshold idle period may generally be identified below which the air gun timing error will likely remain within the identified acceptable range of air gun timing error.

6. The method of claim 5, wherein the compensating step comprises advancing the first firing event time according to the identified acceptable range of air gun timing error, as constrained by the threshold idle period.

7. The method of claim 1, further comprising the step of compensating the second firing event time following an idle period according to the identified relationship to control the timing error within the identified acceptable range.

8. An article for controlling timing error in the firing of an idle seismic air gun, comprising one or more machine-readable storage media containing instructions that when executed enable a computer to:
   identify a relationship between seismic air gun timing error and an idle period preceding a seismic air gun firing event; and
   compensate a first air gun firing event time following an idle period according to the identified relationship to control the timing error within a given acceptable range of air gun timing error.

9. The article of claim 8, wherein the one or more machine-readable storage media contain instructions that when executed enable a computer to:
   identify a threshold idle period below which the air gun timing error will likely remain within the acceptable range of air gun timing error; and
   advance the first firing event time according to the acceptable range of air gun timing error, as constrained by the threshold idle period.

10. A method of firing seismic air guns towed through a body of water by a marine vessel, comprising the steps of:
    identifying an acceptable range of timing error for the towed seismic air guns;
    identifying a relationship between seismic air gun timing error and an idle period preceding a seismic air gun firing event, so as to predict a threshold idle period below which the air gun timing error will likely remain within the identified acceptable range;
    determining a desired center-of-source position;
    selecting one of a plurality of towed seismic air gun groups to function as a composite seismic source based upon proximity of the respective air gun group centers to the desired center-of-source position; and
    firing the composite seismic source according to the identified acceptable range of air gun timing error, the predicted threshold idle period, and the position of the composite seismic source center relative to the desired center-of-source position.

11. The method of claim 10, wherein
    the selecting step comprises predicting which one of the towed air gun group centers will be closest to the desired center-of-source upon expiration of the predicted threshold idle period; and
    the firing step comprises firing the predicted closest air gun group before expiration of the predicted threshold idle period.

12. The method of claim 10, wherein
    the selecting step comprises predicting which two of the towed air gun group centers will be closest to the desired center-of-source upon expiration of the predicted threshold idle period; and
    the firing step comprises toggled firing of the predicted two closest air gun groups before expiration of the predicted threshold idle period.

13. The method of claim 10, wherein the firing step comprises advancing the first firing event time following an idle period according to the identified acceptable range of air gun timing error.

14. The method of claim 10, wherein the selecting step employs dead-band conditions to prevent erratic changes between towed air gun groups.

15. The method of claim 10, wherein each towed air gun group comprises an air gun that is not contained in any other towed air gun group.

16. The method of claim 10, wherein two or more towed air gun groups comprise at least one common air gun.

17. The method of claim 10, wherein the desired center-of-source position is based upon at least one of a depth and a sail line.

18. The method of claim 10, wherein the selecting step comprises predicting required changes in the desired center-of-source positions, and postponing changes between towed air gun groups as constrained by overshoot limits.

* * * * *